(12) United States Patent
Simard et al.

(10) Patent No.: US 7,376,275 B2
(45) Date of Patent: May 20, 2008

(54) CLUSTERING

(75) Inventors: Patrice Y. Simard, Bellevue, WA (US); Henrique S. Malvar, Sammamish, WA (US); Erin L. Renshaw, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/198,562

(22) Filed: Aug. 5, 2005

(65) Prior Publication Data
US 2005/0271281 A1    Dec. 8, 2005

Related U.S. Application Data

(62) Division of application No. 10/133,558, filed on Apr. 25, 2002, now Pat. No. 7,164,797.

(51) Int. Cl.
*G06K 9/68* (2006.01)
(52) U.S. Cl. ...................................................... 382/218
(58) Field of Classification Search .................. 382/218
See application file for complete search history.

(56) References Cited

U.S. PATENT DOCUMENTS

| | | | |
|---|---|---|---|
| 3,606,546 A * | 9/1971 | Dudley .......................... | 355/40 |
| 3,719,922 A * | 3/1973 | Lopes et. al. ................... | 367/11 |
| 3,882,454 A | 5/1975 | Marie et al. | |
| 4,606,069 A | 8/1986 | Johnson et al. | |
| 4,747,156 A | 5/1988 | Wahl | |
| 4,754,492 A | 6/1988 | Malvar | |
| 4,922,545 A | 5/1990 | Endoh et al. | |
| 4,924,494 A * | 5/1990 | Shung .................... | 379/100.12 |
| 5,077,807 A * | 12/1991 | Bokser ........................ | 382/160 |

(Continued)

FOREIGN PATENT DOCUMENTS

EP    0 567 344 A2    10/1993

(Continued)

OTHER PUBLICATIONS

U.S. Appl. No. 10/180,800, filed Jun. 26, 2002, Malvar et al.

(Continued)

*Primary Examiner*—Bhavesh M. Mehta
*Assistant Examiner*—Jonathan Schaffer
(74) *Attorney, Agent, or Firm*—Amin, Turocy & Calvin, LLP

(57) ABSTRACT

Systems and methods for performing clustering of a document image are disclosed. A property of an extracted mark from a document is compared to the properties of the existing clusters. If the property of the mark fails to match any of the properties of the existing clusters, the mark is added as a new cluster to the existing cluster. One property that can be utilized is x size and y size, which is the width and height, of the existing clusters. Another property that can be employed is ink size, which refers to the ratio of black pixels to total pixels in a cluster. Yet another property that can be utilized is a reduced mark or image, which is a pixel size reduced version the bitmap of the mark and/or cluster. The above properties can be employed to identify mismatches and reduce the number of bit by bit comparisons performed.

20 Claims, 12 Drawing Sheets

U.S. PATENT DOCUMENTS

| | | |
|---|---|---|
| 5,129,014 A | 7/1992 | Bloomberg |
| 5,304,991 A | 4/1994 | Motegi |
| 5,402,146 A | 3/1995 | Rodriguez et al. |
| 5,434,953 A | 7/1995 | Bloomberg |
| 5,454,047 A | 9/1995 | Chang et al. |
| 5,572,565 A | 11/1996 | Abdel-Mottaleb |
| 5,572,604 A | 11/1996 | Simard |
| 5,592,568 A | 1/1997 | Wilcox et al. |
| 5,610,996 A | 3/1997 | Eller |
| 5,689,585 A | 11/1997 | Bloomberg et al. |
| 5,737,455 A | 4/1998 | Harrington et al. |
| 5,754,183 A | 5/1998 | Berend et al. |
| 5,778,092 A | 7/1998 | MacLeod et al. |
| 5,790,696 A | 8/1998 | Takahashi |
| 5,805,727 A | 9/1998 | Nakano |
| 5,805,739 A | 9/1998 | Malvar et al. |
| 5,828,771 A | 10/1998 | Bloomberg |
| 5,883,986 A | 3/1999 | Kopec et al. |
| 5,910,805 A | 6/1999 | Hickey et al. |
| 5,914,748 A | 6/1999 | Parulski et al. |
| 5,915,044 A | 6/1999 | Gardos et al. |
| 5,917,951 A | 6/1999 | Thompson et al. |
| 5,917,964 A * | 6/1999 | Normile ............ 382/300 |
| 5,923,380 A | 7/1999 | Yang et al. |
| 5,930,377 A * | 7/1999 | Powell et al. ......... 382/100 |
| 5,960,111 A | 9/1999 | Chen et al. |
| 5,960,119 A | 9/1999 | Echigo et al. |
| 5,991,515 A | 11/1999 | Fall et al. |
| 6,000,124 A | 12/1999 | Saito et al. |
| 6,020,972 A | 2/2000 | Mahoney et al. |
| 6,029,126 A | 2/2000 | Malvar |
| 6,058,362 A | 5/2000 | Malvar |
| 6,064,762 A | 5/2000 | Haenel |
| 6,069,636 A | 5/2000 | Sayuda et al. |
| 6,072,496 A | 6/2000 | Guenter et al. |
| 6,073,153 A | 6/2000 | Malvar |
| 6,094,506 A | 7/2000 | Hullender |
| 6,100,825 A | 8/2000 | Sedluk et al. |
| 6,108,444 A | 8/2000 | Syeda-Mahmood |
| 6,108,446 A | 8/2000 | Hoshen |
| 6,115,689 A | 9/2000 | Malvar |
| 6,118,890 A | 9/2000 | Senior |
| 6,137,908 A | 10/2000 | Rhee |
| 6,144,767 A | 11/2000 | Bottou et al. |
| 6,151,424 A | 11/2000 | Hsu |
| 6,154,762 A | 11/2000 | Malvar |
| 6,182,034 B1 | 1/2001 | Malvar |
| 6,192,360 B1 | 2/2001 | Dumais et al. |
| 6,233,364 B1 | 5/2001 | Krainiouk et al. |
| 6,240,380 B1 | 5/2001 | Malvar |
| 6,253,165 B1 | 6/2001 | Malvar |
| 6,256,608 B1 | 7/2001 | Malvar |
| 6,272,253 B1 | 8/2001 | Bannon et al. |
| 6,285,801 B1 | 9/2001 | Mancuso et al. |
| 6,295,371 B1 | 9/2001 | Rucklidge et al. |
| 6,309,424 B1 | 10/2001 | Fallon |
| 6,310,972 B1 | 10/2001 | Li et al. |
| 6,321,243 B1 | 11/2001 | Ballard |
| 6,324,560 B1 | 11/2001 | Malvar |
| 6,326,977 B1 | 12/2001 | Westerman |
| 6,334,001 B2 | 12/2001 | de Queiroz et al. |
| 6,345,119 B1 | 2/2002 | Hotta et al. |
| 6,411,733 B1 | 6/2002 | Saund |
| 6,564,263 B1 | 5/2003 | Bergman et al. |
| 6,633,670 B1 | 10/2003 | Matthews |
| 6,658,151 B2 | 12/2003 | Lee et al. |
| 6,731,800 B1 | 5/2004 | Barthel et al. |
| 6,735,335 B1 | 5/2004 | Liu et al. |
| 6,738,079 B1 | 5/2004 | Kellerman et al. |
| 6,819,796 B2 | 11/2004 | Hong et al. |
| 6,826,727 B1 | 11/2004 | Mohr et al. |
| 6,901,153 B1 | 5/2005 | Leone |
| 6,907,141 B1 | 6/2005 | Okamoto |
| 6,941,014 B2 | 9/2005 | Lin et al. |
| 6,977,664 B1 | 12/2005 | Jinzenji et al. |
| 7,039,232 B2 | 5/2006 | Nagarajan et al. |
| 2001/0004618 A1 | 6/2001 | Hur |
| 2002/0064313 A1 | 5/2002 | Cheng |
| 2003/0123729 A1 | 7/2003 | Mukherjee et al. |
| 2003/0133615 A1 | 7/2003 | Bern et al. |
| 2003/0198386 A1 | 10/2003 | Luo |
| 2003/0229856 A1 | 12/2003 | Lynn et al. |

FOREIGN PATENT DOCUMENTS

| | | |
|---|---|---|
| EP | 0 621 554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2 230 633 A | 10/1990 |

OTHER PUBLICATIONS

U.S. Appl. No. 10/133,842, filed Apr. 25, 2002, Simard et al.
U.S. Appl. No. 10/133,558, filed Apr. 25, 2002, Simard et al.
U.S. Appl. No. 10/133,939, filed Apr. 25, 2002, Simard et al.
U.S. Appl. No. 10/180,649, filed Jun. 26, 2002, Simard et al.
U.S. Appl. No. 10/180,169, filed Jun. 26, 2002, Simard et al.
U.S. Appl. No. 10/180,771, filed Jun. 26, 2002, Simard et al.
U.S. Appl. No. 11/286,622, filed Nov. 23, 2005, Malvar et al.
Yiu-Fai Wong, et al.; Preprocessing of Video Signals for MPEG Coding by Clustering Filter; Proceedings of the '95 Int'l. Conf. on Image Processing (ICIP '95); pp. 129-132.
Patrick Haffner, et al.; "DjVu: Analyzing and Compressing Scanned Documents for Internet Distribution"; AT&T Labs-Research; pp. 1-4.
Felix Balado Pumarino, et al.; "A Two-Stage Codebook Building Method Using Fast WAN"; University of Vigo, Communications Technology Department.
Henrique S. Malvar; "Fast Progressive Wavelet Coding"; Microsoft Research.
Patrice Y. Simard, et al.; "A Wavelet Coder for Masked Images"; Proceedings of the Data Compression Conference (DCC'01); Microsoft Research.
European Search Report dated Sep. 15, 2005, mailed Sep. 30, 2005, for European Patent Application Serial No. EP 03 00 5429, 4 Pages.
Witten, Ian H., et al; "Textual Image Compression", Data Compression Conference, IEEE, 10 pages, Mar. 24, 1992.
European Search Report dated Nov. 21, 2005, mailed Nov. 30, 2005, for European Patent Application Serial No. EP 03 00 6769, 3 Pages.
Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.
Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.
Haffner, et al. "Browsing through high quality document images with DjVu" Research and Technology Advances in Digital Libraries. ADL 1998 Proceedings (Apr. 22, 1998) IEEE International Forum in Santa Barbara, California, pp. 309-318.
Simard, et al. "A Wavelet Coder for Masked Images" Proceedings IEE Data Compression Conference (Mar. 27, 2001) Snowbird, Utah, pp. 93-102.
Simard, et al. "A Forefround/Background Separation Algorith for Image Compression" (Mar. 23, 2004) Data Compression Conference, Snowbird, Utah, pp. 498-507.
European Search Report dated Oct. 4, 2005 mailed Oct. 13, 2005 for EPApplication Serial No. 03005430, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for EP Application Serial No. 03/005,431, 5 pages.

Debargha Mukherjee, et al.; "JPEG2000-Matched MRC Compression of Compound Documents"; Jun. 6, 2002.

Rangachar Kasturi, et al.; "Document Image Analysis: A Primer"; Sadhana vol. 27, Part 1, Feb. 2002, pp. 3-22.

Qian Huang et al.; "Foreground/Background Segmentation of Color Images by Integration of Multiple Cues"; Proceedings of '95 Int'l. Conf. on Image Processing (ICIP '95); pp. 246-249.

Guotong Feng, et al.; "High Quality MRC Document Coding"; School of Electrical and Computer Engineering; Purdue University; Sarnoff Corporation.

Ping Wah Wong; Halftoning by Multiscale Dot Distribution; Proceedings of the '95 Int'l. Conf. on Image Processing (ICIP '95); pp. 117-120.

Yann LeCun, et al.; "Learning Algorithms for Classification: A Comparison on Handwritten Digit Recognition"; AT&T Bell Laboratories.

Patrice Y. Simard, et al.; "Boxlets: A Fast Convolution Algorithm for Signal Processing and Neural Networks"; AT&T Labs-Research.

Trevor Hastie, et al.; "Metrics and Models for Handwritten Character Recognition"; Dec. 8, 1997; pp. 1-18.

Leon Bottou, et al.; "High Quality Document Image Compression with DjVu"; Jul. 13, 1998; AT&T Labs.

Patrick Haffner, et al.; "Color Documents on the Web with DjVu"; AT&T Labs—Research.

* cited by examiner

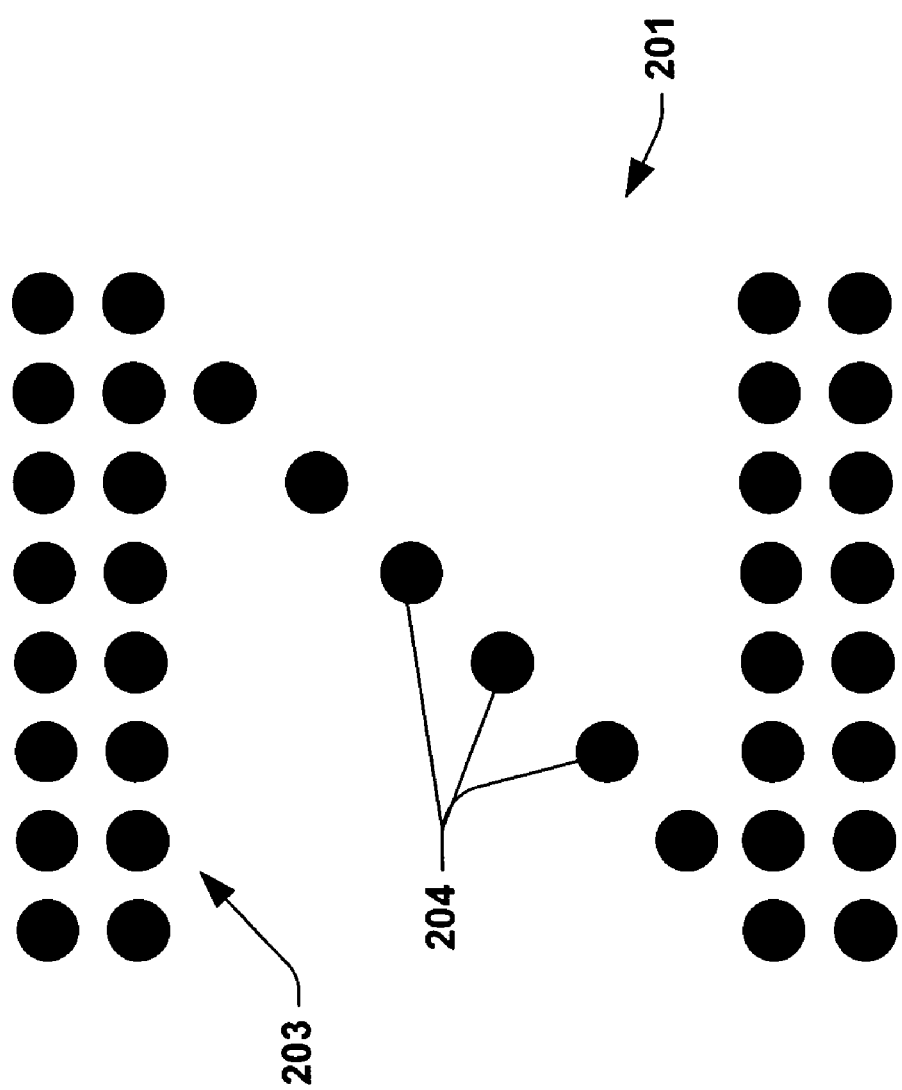

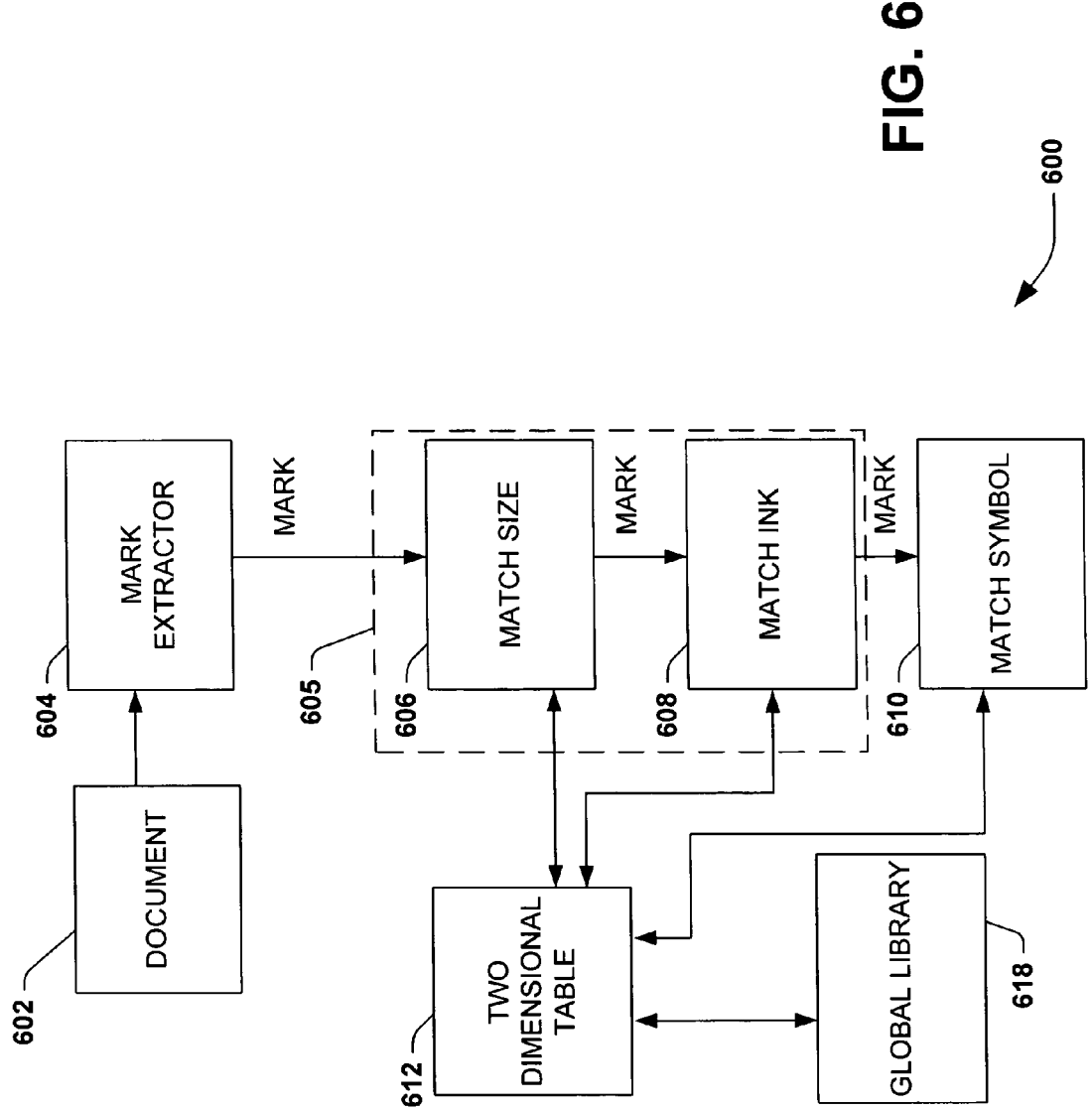

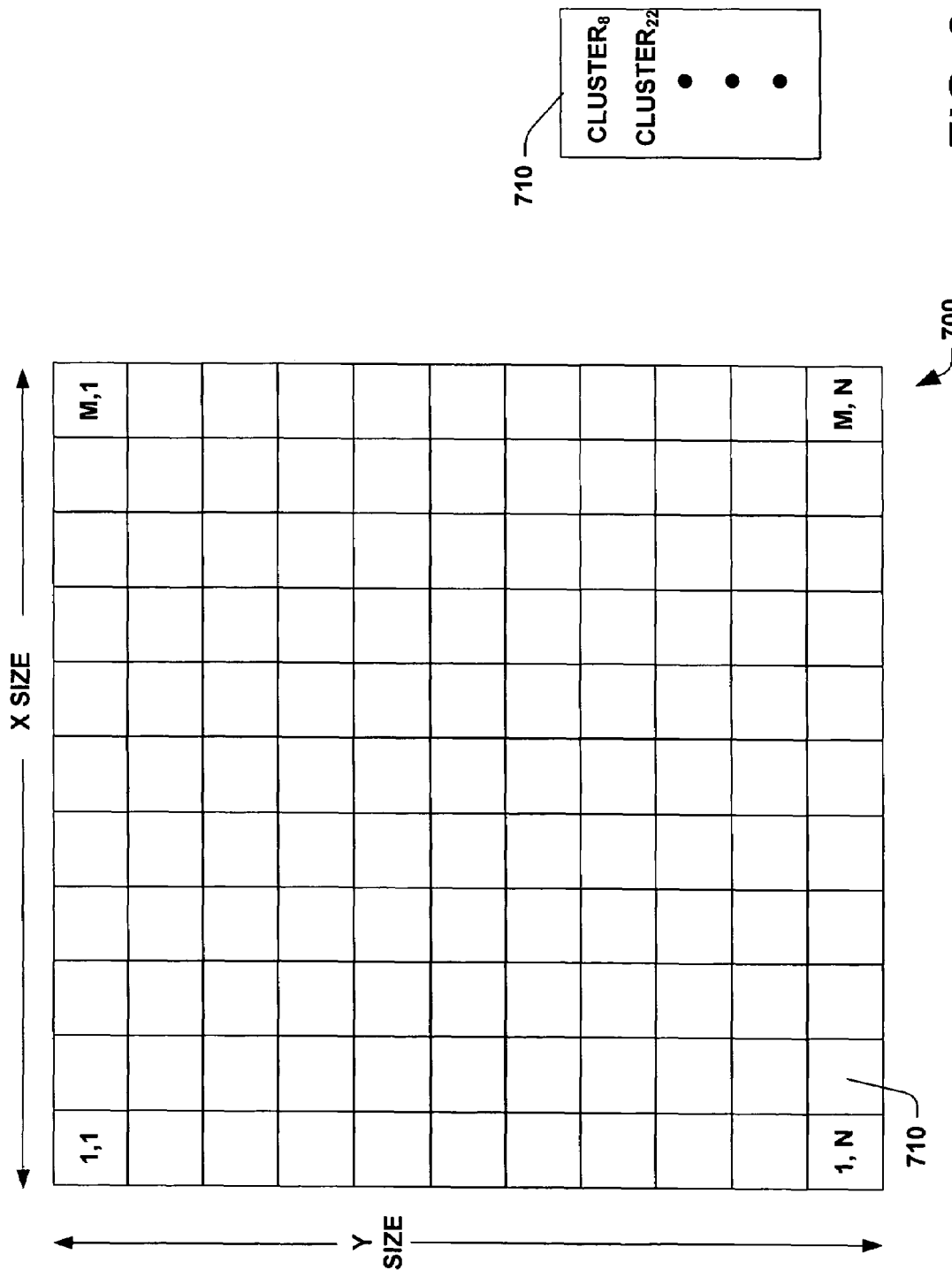

| UNIQUE IDENTIFICATION | X SIZE | Y SIZE | BMAP | INK SIZE | RESIZED IMAGE |
|---|---|---|---|---|---|
| 0 | 10 | 20 | | 65 | |
| 4 | 12 | 15 | | 65 | |
| 3 | 8 | 15 | | 80 | |
| 2 | 11 | 20 | | 75 | |
| 25 | 4 | 11 | | 55 | |

CLUSTERING

CROSS-REFERENCE TO RELATED APPLICATIONS

This application is a divisional of U.S. patent application Ser. No. 10/133,558, entitled "CLUSTERING," filed on Apr. 25, 2002, the entirety of which is incorporated herein by reference.

TECHNICAL FIELD

The present invention relates generally to document image processing, and more particularly to systems and methods for performing clustering.

BACKGROUND OF THE INVENTION

The amount of information available via computers has dramatically increased with the wide spread proliferation of computer networks, the Internet and digital storage means. With such increased amount of information has come the need to transmit information quickly and to store the information efficiently. Data compression is a technology that facilitates effectively transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed image can require 5 megabytes of space whereas the same image can be compressed and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with images or non-critical text where a certain amount of distortion or noise is either acceptable or imperceptible to human senses. Data compression is especially applicable to digital representations of documents (digital documents). Typically, digital documents include text, images and/or text and images. In addition to using less storage space for current digital data, compact storage without significant degradation of quality would encourage digitization of current hardcopies of documents making paperless offices more feasible. Striving toward such paperless offices is a goal for many businesses because paperless offices provide benefits, such as allowing easy access to information, reducing environmental costs, reducing storage costs and the like. Furthermore, decreasing file sizes of digital documents through compression permits more efficient use of Internet bandwidth, thus allowing for faster transmission of more information and a reduction of network congestion. Reducing required storage for information, movement toward efficient paperless offices, and increasing Internet bandwidth efficiency are just some of many significant benefits associated with compression technology.

Compression of digital documents should satisfy certain goals in order to make use of digital documents more attractive. First, the compression should enable compressing and decompressing large amounts of information in a small amount of time. Secondly, the compression should provide for accurately reproducing the digital document. Additionally, data compression of digital documents should make use of an intended purpose or ultimate use of a document. Some digital documents are employed for filing or providing hard copies. Other documents may be revised and/or edited. Many conventional data compression methodologies fail to handle re-flowing of text and/or images when viewed, and fail to provide efficient and effective means to enable compression technology to recognized characters and re-flow them to word processors, personal digital assistants (PDAs), cellular phones, and the like. Therefore, if hard copy office documents are scanned into digital form, current compression technology can make it difficult if not impossible to update, amend, or in general change the digitized document.

Digital documents generally include a large amount of textual information. Without any compression, a single 8.5 by 11 inch document at 200 dots per inch (dpi) uses almost 2 MB of storage space. But, textual information has properties, which afford for compression. One approach to compress textual information is to perform optical character recognition (OCR) on the text and represent the document as a sequence of character codes in a standard alphabet such as ASCII. However, there are some drawbacks to using OCR in that OCR is not completely reliable, particularly with respect to poor quality documents. Noise in the document, varying typefaces and unusual characters all can produce OCR errors. Additionally, special fonts, foreign languages and mathematical formulas create special problems.

Another approach for compressing digital documents is to use clustering. Clustering involves finding connected components (a connected component is a set of pixels of a given color which are connected) of a document, and the connected components are searched and analyzed to locate similarly connected components referred to as clusters. The clusters generally, can greatly increase compression and can avoid some of the reliability problems of OCR. For example, a single paged 8.5 by 11 inch document at 200 dpi uses almost 2 MB of storage space uncompressed, but uses only about 200 k with clustering. The reason for the sharp reduction in file size, is that each connected component can be summarized by a position, and a pointer to a shape belonging to a dictionary of shapes. The clustering part of the algorithm determines which shape(s) should belong to the dictionary, and which shape is the closest to each connected component. Typically, the dictionary of shapes is a fraction of the size of an original document image, and can even be shared across pages. The pointers to the shapes can be characterized by a position in the page (X and Y), and a shape number. The X and Y position can be compressed using previous position, while the shape indices are compressed using context or a language model. Thus, clustering can greatly increase compression; however analyzing connected components to find similar connected components (clusters) is generally, a computationally intense process. A single page or multi page document can easily have thousands of connected components or more that are compared in order to find similar connected components.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods for encoding and decoding document images, and, more specifically to clustering. Clustering includes grouping similar marks, which are mostly connected pixels, into clusters to increase compression. Clustering can consume a large amount of memory and processor resources because each mark has to be compared, bit by bit, to other marks in order to identify clusters. The present invention reduces memory and processor resource usage by identifying mismatched clusters and thus, avoiding bit by bit comparisons to such mismatched clusters. The process of identifying mismatches can be referred to as screening. Even though some conventional clustering approaches utilize screening, the present invention's choice of screening tests or properties makes it particularly efficient. The present invention utilizes properties of existing clusters, and a property of an extracted mark from a document is compared to the cluster properties. This comparison does not require a timely and expensive, bit by bit, comparison to identify mismatches. If the property of the mark fails to match any of the cluster properties (if the mark is deemed too far from the existing clusters), the mark is added as a new cluster and a bit by bit comparison can be avoided.

The invention provides a computationally efficient screening for detecting mismatches, and a computationally efficient algorithm for detecting positive matches for the clustering.

In accordance with one aspect of the invention, the clusters are characterized by the first element or mark inserted in the cluster. The first advantage is that adding a new mark to a cluster does not require recomputation of the cluster's characteristics. Another advantage of this approach is that it avoids "cluster drift", which happens when a cluster center moves or is modified with every addition of a new mark to the cluster. Avoiding cluster drift yields guarantees on the maximum distance between two elements of the same cluster. This guarantee allows more efficient and aggressive screening. The main drawback of this approach is that the clustering is not optimal in the sense that it will yield more clusters, for the same average cluster-to-mark distance, than other clustering algorithms. The main advantage is greatly increased speed. In the case of text compression, having a 10% increase in the number of clusters is not necessarily of concern because the size of the dictionary which convey the information of each clusters is typically a fraction of the size of the of the compressed document.

In accordance with one aspect of the invention, the cluster properties can be stored in a table, for example. One particular property of the clusters that can be employed is x size and y size. The x size and y size provides sizing information of the existing clusters. An x size and a y size of a mark can be compared to the x size and y size of existing clusters to identify mismatches. Additionally, another aspect of the invention is organizes the clusters in a 2D table of buckets, indexed by x size and y-size. When a new mark is found, the bucket of identical x size and y size is extracted from the 2D table of buckets, and the mark is compared to the clusters in the bucket. Adjacent buckets can also be searched for more accurate matches (all the other buckets will be ignored or screened). The "no drift" assumption on the cluster center is useful here, because it guarantees that clusters stay in their bucket.

Another property of the clusters that can be utilized is ink size. The ink size generally refers to a ratio of black pixels to total pixels in a mark or cluster. Similarly, an ink size of a mark can be compared to the ink size of existing clusters to identify mismatches.

Another property of the marks is their "hot point". The hot point is a location on the mark, which can be the center of gravity, or computed by other mean (for instance the line equation of the surrounding characters. During comparison, the hot points of the mark and the cluster are aligned before the comparison begin, often resulting in a translation. Another cluster property is a reduced mark or image, which is a pixel size reduced version a bitmap of the mark and/or cluster. In one aspect of the invention, the reduced mark is centered on the hot point, and the mark is rescaled so that the reduced mark has a fixed size. Again, the non-drifting assumption of the cluster is useful in guaranteeing that the reduced version of a cluster is a good representation of the all marks in the cluster. The reduced mark can be compared to the reduced mark or reduced image of existing clusters to identify mismatches.

According to another aspect of the invention, when a mark succeeds all the feature tests, it is then compared to the cluster in a more direct way. A distance between the mark and the cluster is computed, and compared to a first threshold. The distance can be an XOR distance, a more complex distance, or a combination of distances, each distance being used as a screening for the more complex and meaningful distances. If the distance(s) are inferior to their corresponding thresholds (which can be determined experimentally) the mark is added to the current cluster.

In one aspect of the invention, the clusters are kept in size order, so that the clusters which are the most likely to match are compared to the mark first, thus reducing the number of comparison when a match is found early.

Another aspect of the invention is a clustering system. The clustering system includes a mark extractor, a library, a table, a match component and a match symbol component. The mark extractor extracts a mark from a document. The library is operative to store existing clusters and information about those existing clusters. The table stores matching properties of the existing clusters. The match component is operative to compare at least one property of the mark to the match properties from the table of match properties to identify matching existing clusters. The match symbol component is operative to compare the mark to the matching existing clusters and identify a most matching cluster, or, when speed is essential, to identify the first cluster such that the distance between the mark and the cluster is less than a first threshold.

Another aspect of the invention relates to how a final bitmap of each cluster is computed. Once clustering is finished, the bitmap of each cluster is evaluated by aligning all the marks in the cluster according to the hot point, and averaging for each location the pixels of all the mark in the cluster. For each location, if the average value is greater than 0.5 the cluster's bitmap pixel at that location is set to 1, while if the average value is less than 0.5 the cluster's bitmap pixel at that location is set to 0. If the average is exactly 0.5, the 8 neighboring average are also averaged, and the pixel value is set to either 1 if the new average is greater than 0.5, or 0 otherwise. The resulting bitmap is entered in a dictionary of shapes, and all the marks in that cluster point to it when the image is to be encoded.

Another aspect of the invention provides a method of clustering. A document is provided. The document is binary and typically includes textual information. A mark is found in the document. A first property of the mark is compared with first properties of existing clusters to identify matching and mismatching clusters. The bitmap of the mark is compared with bitmaps of the matching clusters to find a most matched cluster of the matching clusters or, to improve speed of clustering, to find the first cluster such that the distance between the mark and the cluster is less than a first threshold. The mark is added as a new cluster if there is no matched cluster.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 2 illustrates an exemplary mark according to one aspect of the invention.

FIG. 6 is a block diagram of a clustering system according to one aspect of the invention.

FIG. 7 is a block diagram of a two dimensional table according to one aspect of the invention.

FIG. 8 is a block diagram of an entry of a two dimensional table according to one aspect of the invention.

FIG. 9 illustrates an exemplary cluster according to one aspect of the invention.

DETAILED DESCRIPTION OF THE INVENTION

Figure 1:
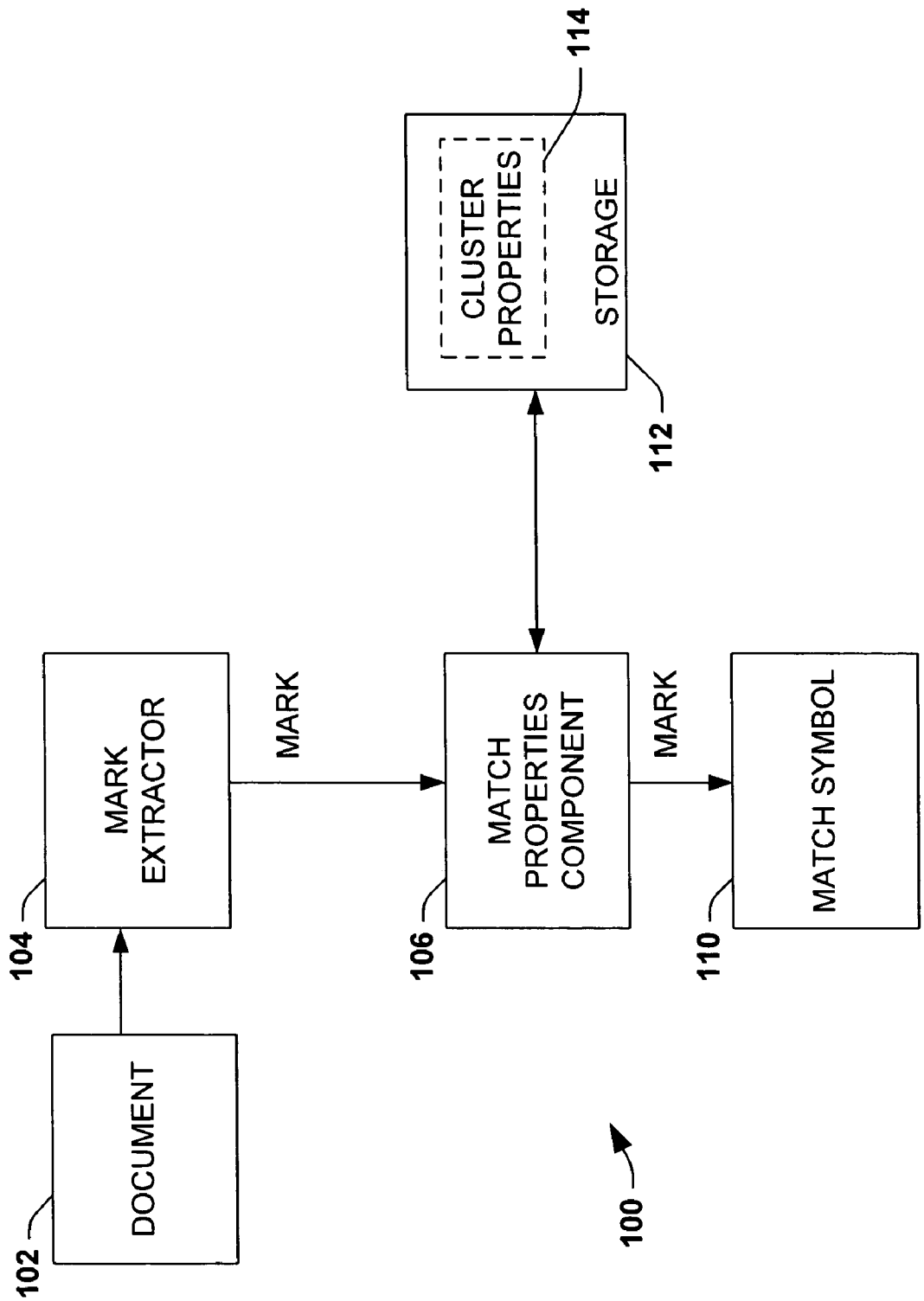
FIG. 1 is a block diagram of a clustering system according to one aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component may be localized on one computer and/or distributed between two or more computers.

Further, "document image" is intended to refer to a digital representation of document(s) comprising one or more color(s) (e.g., binary (black/white), gray-scale and/or color document(s)). Additionally, a document image can have image(s), text and/or text with images, with potential superimposition of text and images. A document image can comprise binary, RGB, YUV and/or other representations of document(s). An RGB document image is represented red, green and blue components. A YUV document image is represented using a luminescence component denoted by Y and chrominance components denoted by U and V. The YUV representation is, generally, more suitable for compression because the human eye is less sensitive to U and V distortion, and therefore U and V can be subsampled by a factor 2, and because Y captures the correlations between R, G and B. For the purpose of text clustering, the Y representation is particularly interesting because text is generally easier to read when resulting from a change of luminance. Text resulting from a change of chrominance, for instance from red to green, at a given luminance, is typically harder to read. A color document, can therefore be transformed into a YUV document, which can then be compressed or binarized, while substantially maintaining textual information. A document image comprises picture elements commonly referred to as "pixels". A document image can be based on single or multi-page document(s) of any shape or size.

FIG. 1 illustrates a clustering system 100 according to one aspect of the invention. The clustering system 100 extracts marks from a document and creates clusters from the marks in a computationally efficient manner by avoiding a large number of bit by bit comparisons of found marks to existing clusters. The clustering system 100 performs a number of comparisons that identify matches and mismatches among marks and existing clusters, and thereby avoid many computationally expensive, bit by bit comparisons.

A mark extractor 104 extracts a mark from a document 102 (e.g., that typically includes textual information). Generally, the document 102 is a binary document image, however it is appreciated that alternate aspects of the invention can include a document having any suitable number of levels or colors. The document 102 has one or more pages, and can be an extracted layer or mask from another document image. The mark is, generally, a plurality of connected pixels of a given color and can also be referred to as a connected component. Often, a mark is an alphanumeric character such as "e". However, unlike OCR, a mark is not identified as a specific character.

A common representation of text in a document is text represented as black text on white. This system 100 is described, for simplicity, with text of the document 102 represented by black. However, it is appreciated that text can be represented as any suitable color or shade on any other color or shade.

The mark extractor 104 scans the document 102 (e.g., from left to right, top to bottom) to identify or locate a "seed" of a mark. The seed is a first non-white pixel the mark extractor 104 identified/located. The mark extractor 104 initiates scanning from a starting position or pixel. The starting position is, typically, in the upper left hand corner of the document, and is updated after each mark is extracted. Thus, for example, a tallest leftmost mark is located first. Once the seed is found, an algorithm is applied that locates connected pixels. The mark extractor 104 then extracts the mark, comprising the connected pixels, and removes it from the document 102.

A match properties component 106 receives the mark from the mark extractor. The match properties component 106 compares one or more properties of the mark to corresponding one or more properties of existing clusters 114 in order to identify mismatches. This comparison can also be referred to as screening. The one or more properties can include, for example, a bitmap image of the mark, the center of gravity of the mark, the x size, the y size, the ink size, the position information and the resized mark image. A storage component 112 stores the one or more properties of the existing clusters 114 and provides the properties to the match properties component 106. The storage component 112 can be a storage device such as, memory, hard drive, flash memory and the like. The one or more properties of the mark can be computed by the match properties component 106, if needed. Similarly, the one or more properties of the existing clusters 114 can also be computed by the match properties component 106, if needed.

The match properties component 106 computes a range of acceptable values for the one or more properties using a threshold. The threshold can, for example, be 80% meaning that the properties of existing clusters can fall within 80% of the corresponding properties of the mark. The threshold can be adjusted to improve performance of the system. However, the greater the threshold, the less likely the mark will be added to an existing cluster and the less compression will be obtained. Multiple thresholds, for each of the properties can be used.

The one or more properties can be compared sequentially or in parallel. For example, to compare sequentially, an x size property of the mark can be compared to an x size property of the existing clusters, then an ink size of the mark can be compared to an ink size of the existing clusters. Sequential comparisons benefit from the fact that most comparison are expected to fail since the problem is to find one appropriate cluster out of many. Therefore the computationally cheapest feature comparisons are done first, and as soon as one fails, the remaining comparison for this cluster do not need to be performed. The cluster is a mismatch, and the next cluster is considered. As another example, to compare in parallel, an x size and an ink size of the mark can be compared to an x size and an ink size of the existing clusters. Parallel comparisons benefit from performing multiple comparisons simultaneously. Parallel comparisons can utilize a greater number of comparisons, but can improve speed by performing the computations in parallel.

If a mismatch is identified, meaning that one of the one or more properties of the existing clusters fails to fall within the acceptable range(s), or the distance between the mark and the cluster also fails to be within the acceptable range, the mark is added to the existing clusters as a new cluster. Furthermore, processing of the mark by the system is complete. Another mark of the document can be processed by the system 100.

If a match is identified, meaning that there is at least one matching existing cluster, a match symbol component 110 compares a bitmap of the mark to bitmaps of the at least one matching clusters. The bitmaps are compared, bit by bit, to identify clusters of the at least one matching existing cluster that have a similar bitmap. This comparison can also be referred to as matching. More than one distance matching can be computed. For instance, an XOR distance can be first computed, meaning that 1 is added to the distance for every mismatched bits, followed by a more complex and more computationally expensive distance if the first distance falls within certain range. Other suitable matching procedures can be used in accordance with the present invention, such as a weighted exclusive-or (WXOR), which weights the pixels according to a number of neighboring pixels that are set; weighted AND-NOT (WAN), which is similar to the WXOR buy treats black to white errors separately from white to black errors when calculating weights; pattern matching and substitution (PMS), which rejects a match if any position in the error map is found to have four or more neighbors that are set; combined size-independent strategy (CSIS), which augments the PMS procedure by utilizing heuristics to detect thin strokes or gaps; and compression-based template matching (CTM). The matching procedure or comparison can be terminated at the first acceptable matching existing cluster as the matched cluster. A threshold value is chosen that allows for small deviations in bitmaps of the mark and the at least one matching existing cluster. Approaches for comparing the bitmaps are explained in further detail below, with respect to FIG. 6. Alternately, the matching procedure can continue through all of the at least one matching existing clusters to identify the best matched or most matched cluster as the matched cluster. The mark, on the matched cluster being found or identified, is added to the matched cluster's set of similar marks. The bitmap of the matched cluster can be updated with an average utilizing the mark's bitmap.

If a mismatch with respect to the bitmaps is identified, meaning that no bitmap of the at least one matching clusters is acceptable, the mark is added to the existing clusters as a new cluster. Additionally, processing of the mark by the system 100 is complete. The system 100 can continue on with all of the remaining marks in the document.

Figure 4:
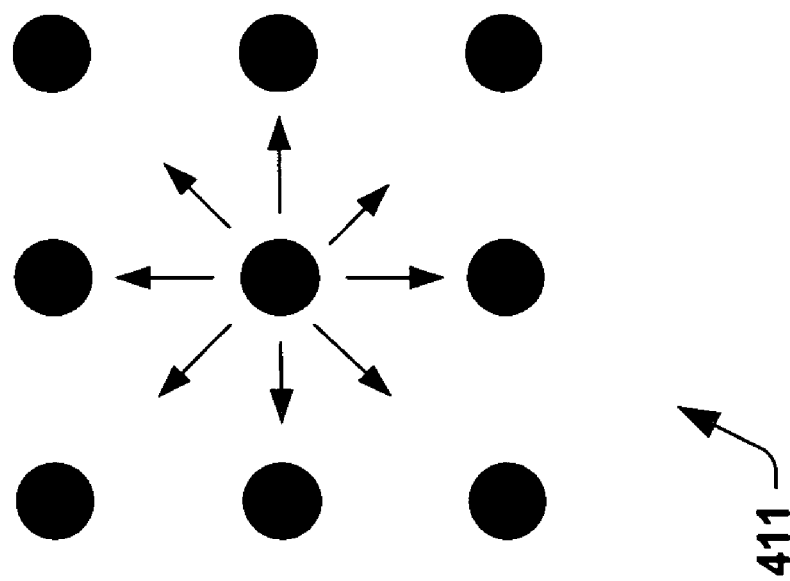
FIG. 4 illustrates an 8-connectivity property.
Figure 3:
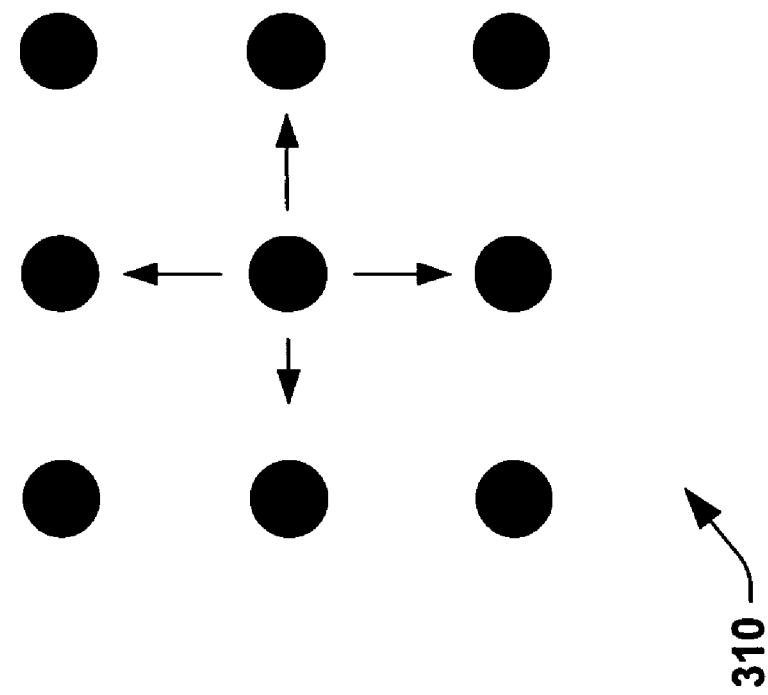
FIG. 3 illustrates a 4-connectivity property.

FIG. 2 illustrates an exemplary mark 201 according to an aspect of the invention. The connected pixels are found utilizing a connectivity property. The exemplary mark 201 is representative of a textual character (e.g., the letter "z"). Typically, an 8-connectivity property is used to locate the connected pixels, however a 4-connectivity property can also be used. The 4-connectivity property only identifies connected pixels in four primary compass directions. FIG. 3 illustrates the 4-connectivity property by showing a pixel surrounded by 4 pixels in the four primary compass directions 310. The 8-connectivity property identifies connected pixels in every searchable neighbor direction, the eight immediate neighbors, one in each of the eight principal directions. FIG. 4 illustrates the 8-connectivity property by showing a pixel surrounded by 8 pixels in the eight principal directions 411. For example, pixels 203 in FIG. 2 are identified according to the 4-connectivity property and the 8-connectivity property. However, the 4-connectivity property would not identify pixels 204 as connected pixels.

Referring again to FIG. 1, the mark extractor 104 can find the marks using the following algorithm. First convert the binary image to a run length encoding (RLE) representation. Assuming that there are n runs, create n sets, and put a run in each set. Then for each line, and for each run, find all the runs in the previous line which touches the current run, using 4-connectivty or 8-connectivity. Perform a union of all the sets which contain the runs that touches. At the end of the page, the remaining sets, are the marks. This algorithm can be referred to as the "union-find" algorithm. The complexity is O(n log*(n)), where n is the number of runs, and log* is the inverse of the Ackerman function. Thus, the complexity is approximately O(n), where n is the number of runs. Additionally, the marks can be computed for both the image, and its negative, in order to cluster reverse video text as well.

Figure 5:
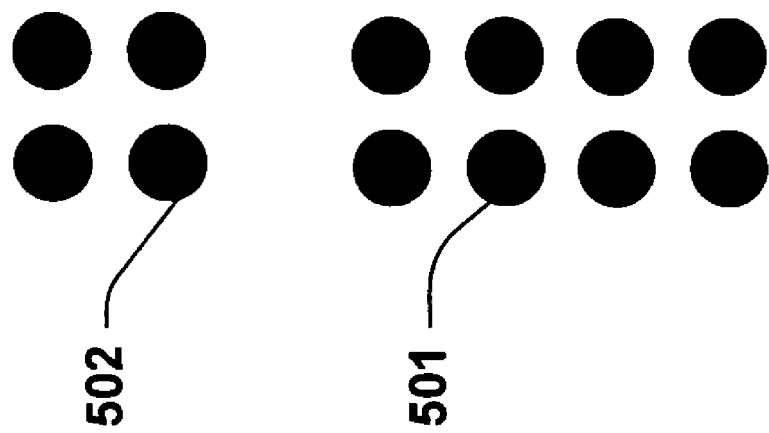
FIG. 5 illustrates an exemplary combined mark according to one aspect of the invention.

As stated above, the mark generally consists of connected pixels. However, the mark extractor 104 can be adapted to identify marks that are not strictly connected pixels. For example, FIG. 5 shows a lower portion 501 of a letter "i" along with an upper dot 502. The lower portion 501 and the dot 502 are distinct connected pixels. However, the mark extractor 104 can identify the lower portion 501 and the dot 502 as a single or combined mark by scanning an additional region from the original mark.

To combine connected components or marks, a line analysis can be performed. For instance connected components can be assembled into words, based on their position in the page, and the words can be assembled into line, also based on their position in the page, and their angle. Once a line has been identified, it is possible to merge all the marks that are positioned vertically on top of each other, with respect to the equation of the line, such that accent and dot marks are attached to the mark of the letter they belonged to. The resulting marks are of course not connected, but can be used in the clustering algorithm as before.

After the mark has been identified, the mark extractor 104 can perform additional computations on the mark. The mark extractor 104 can compute properties of the mark such as, a center of gravity of the mark, an x size, a y size, ink size, area, position information, hot point, and a resized mark image. The x size is computed as the maximum width of the mark. The y size is computed as the maximum height of the mark. If the mark is the combination of two marks (i.e., an "i" and its dot), the y size is the height of the resulting combination. The ink size is the number of black pixels in the mark, while the area is the total number of pixels in the bounding box of the mark (x size times y size). Another sometimes useful feature used to detect mismatches is the ink percentage. The following equation can be used to calculate the ink percentage of a mark or cluster:

$$inkpercentage = \frac{inksize}{area} \qquad \text{Eq. 1}$$

The hot point is a location on the mark, which can be the center of gravity, or computed by other means. As an example, for text, it is possible to do a line analysis and find the equation of the line on which the mark is situated (the is the same algorithm used to find line to join marks such as a dot on a "i"). The hot point for the mark have the horizontal center of gravity for x coordinate, and the intersection of a vertical line going through the same x coordinate with the line equation, for y coordinate. During comparison, the hot points of the mark and the cluster are aligned before the comparison begins, often resulting in a translation of the mark before comparison.

The position information can include information such as coordinates for the mark, and offset, a reference point and/or spacing information.

The resized mark image is a resized version of the mark. The resized mark image is computed as a smaller version, for instance a 3 by 3 pixel image, of the mark. The resized mark image is computed to aid in symbol comparison. The resized symbol is typically much smaller in pixel size than the mark. Any number of algorithms can be used to downsize the mark into the resized mark image. One algorithm is to divide the mask into 9 regions (3 by 3), which is centered on the hot point, and scaled to cover the area of the mark, and compute the averages of the mark, when they intersect each of these regions.

Another algorithm is to remove or discard a number of pixels from the bitmap. However, other algorithms can be used to generate a resized image and still be in accordance with the present invention. It is appreciated that the above computations can be delayed until or if needed by the system in order to increase computational efficiency.

Additionally, it is appreciated that the existing clusters and their properties can be maintained in a local library and a global library in accordance with the present invention. The local library can be employed to store existing clusters for a current page and the global library can be employed to store existing clusters globally for the document 102. In another aspect, frequently occurring existing clusters (e.g., clusters with a relatively large number of associated marks) are maintained in the global library whereas rarely occurring existing clusters are maintained in the local library.

FIG. 6 is a block diagram of a clustering system 600 according to one aspect of the invention. The clustering system 600 extracts marks from a document and creates clusters from the marks in a computationally efficient manner by avoiding a large number of bit by bit comparisons of found marks to existing clusters. The clustering system 600 performs a number of comparisons or screening operations that identify mismatches and thereby avoid many computationally expensive, bit by bit comparisons.

Generally, clusters are characterized by the first element or mark inserted in the cluster. An advantage of this is that adding a new mark to a cluster does not require re-computation of the cluster's characteristics. Another advantage of this approach is that it avoids "cluster drift", which happens when a cluster center moves or is modified with every addition of a new mark to the cluster. Avoiding cluster drift yields guarantees on the maximum distance between two elements of the same cluster. This guarantee allows more efficient and aggressive screening. A drawback of this approach is that the clustering can be less optimal in the sense that it will yield more clusters, for the same average cluster-to-mark distance, than other clustering algorithms. However, an increase in speed of processing generally outweighs the above drawback. As an example, in the case of text compression, having a 10% increase in the number of clusters is not necessarily of concern because the size of the dictionary which conveys the information of each clusters is typically a fraction of the size of the compressed document.

A two dimensional table 612 stores and maintains existing clusters. The existing clusters are previously found or identified clusters. As stated above, a cluster is a group of at least one similar mark. The two dimensional table 612 contains entries according to box sizes or bounding boxes of the existing clusters. Respective entries, referred to as buckets, of the table 612 comprise a list of clusters corresponding to a particular box size. The box size refers to the x size and y size of a mark or cluster. It is appreciated that entries or buckets can be empty. Additionally, a maximum box size can be established for the table since clusters typically fall under a certain box size. Clusters over the maximum box size can be stored in a separate table (e.g., a corporate logo or seal). Typically, marks having relatively larger box sizes are not likely to be similar to other clusters or marks.

FIG. 7 is a block diagram illustrating a possible two dimensional table that can be utilized in system 600 of FIG. 6. As depicted, the entries or buckets are arranged by x size and y size. One bucket 710, having an x size of 1 and a y size of N. The clusters in the bucket 710 are illustrated in FIG. 8.

The mark extractor 604 is operative to obtain marks from the document 602. The document 602 is a digital document and typically includes textual information. The mark extractor 604 removes and processes marks one by one. The mark extractor 604 employs a suitable algorithm to extract and remove marks from the document 602. For respective marks, the mark extractor 604 computes and/or obtains features or properties of the mark including, but not limited to, a bitmap image of the mark, the center of gravity of the mark, the x size, the y size, the ink size, the position information and the resized mark image.

A match size component 606 receives the mark from the mark extractor. The mark includes a bitmap image of the mark, the center of gravity of the mark, the x size, the y size, the ink size, the position information and the resized mark image. The match size component 606 computes a range of acceptable x size and y size values utilizing a threshold. The threshold can, for example, be 10% meaning that acceptable x size and y size values should be within 10% of the x size and the y size of the mark. The threshold can be adjusted to improve performance of the system 600. However, the greater the threshold, the less likely an existing cluster will be found to match and the less compression is typically obtained.

The match size component 606 references the size table 612 to obtain one or more buckets that are within the above acceptable range. The one or more buckets contain a portion of the existing clusters, which can be referred to as size matching clusters. If there are no size matching clusters, the mark is added as a new cluster to the two dimensional table 612. Additionally, the match size component 606 can enlarge the range of size values or include adjacent buckets in order to obtain more size matching clusters, particularly if none are initially identified. The "no drift" assumption described above on the cluster center is useful because it permits the existing clusters to remain in their buckets.

If the mark is added as a new cluster, the mark's information, including but not limited to, a unique identification, the bitmap image of the mark, the center of gravity of the mark, the x size, the y size, the ink size, the position information and a resized mark image are added to a bucket in the two dimensional table 612. The image of the mark (now an image of a new cluster) can be stored separately in a dictionary of shapes wherein the library entry only contains a pointer to the dictionary of shapes or a shape number. The dictionary of shapes can be local and/or global. FIG. 9 illustrates an exemplary entry 901 for an individual cluster.

It is appreciated that the entry 901 is not comprehensive and additional information can be included in an entry of an existing cluster.

Referring once again to FIG. 6, if there is at least one size matching cluster(s), processing of the mark continues with a match ink component 608. The ink size of the mark is respectively compared with an ink size for a next cluster of the size matching clusters. If there is no next cluster of the size matching clusters, the mark is added as a new cluster to the existing clusters as described above. The ink size information is the percentage or ratio of the number of black pixels to the total number of pixels in the mark. If the ink size of the mark matches the ink size of the next cluster, processing of the mark continues with the match symbol component. If the ink size of the mark does not match the ink size of the next cluster, the match ink component continues processing of the mark with a subsequent next cluster of the size matching clusters.

The match symbol component 610 continues processing of the mark. First, the match symbol component 610 compares a resized image of the mark with a resized image of the next cluster. The resized image is a downsized version (e.g. a 3 by 3 pixels representation) of the bitmaps of the mark or cluster. The downsized version can be represented with gray level pixels, rather than binary. This comparison can be performed relatively quickly because only 9 pixels are being compared. A threshold can be established to allow restricted variations of the downsized representations. If the resized images do not match (e.g., mismatched), processing of the mark returns to the match ink component 608 wherein a subsequent next cluster is processed.

Before downsizing, it is advantageous to align the image using a "reference point". A reference point for the referenced cluster and the mark is computed before computing the down-sampled image. A reference point, also referred to as a hot point, can be computed as a center of gravity or computed by other means (e.g., a line equation of the surrounding marks). The center of gravity for a mark or cluster is computed as the average position of the black pixels in each bitmap. Other reference points and multiple reference points can be used to align the images. Before the image is down-sampled, the image is aligned so that the hot point corresponds to the center of the down-sampled image.

If the resized images do match, a bit by bit comparison of the bitmap of the mark and the bitmap of the next cluster is performed. The match symbol component 610 computes a distance between the mark and the next cluster in order to compare the mark and the referenced cluster. If the distance is within a threshold or less than a threshold, then the referenced cluster is a match. Otherwise, processing of the mark is returned to the match ink component 608 and continues with a subsequent next cluster.

One suitable distance that can be utilized by the match symbol component is an "xor" distance. The "xor" distance is computed by generating an error map, which is the bitwise exclusive-OR between the mark and the referenced cluster. The "xor" distance is the number of pixels in the error map. Before the xor distance is computed, the images are aligned by super-imposing their respective hot points.

Figure 10:
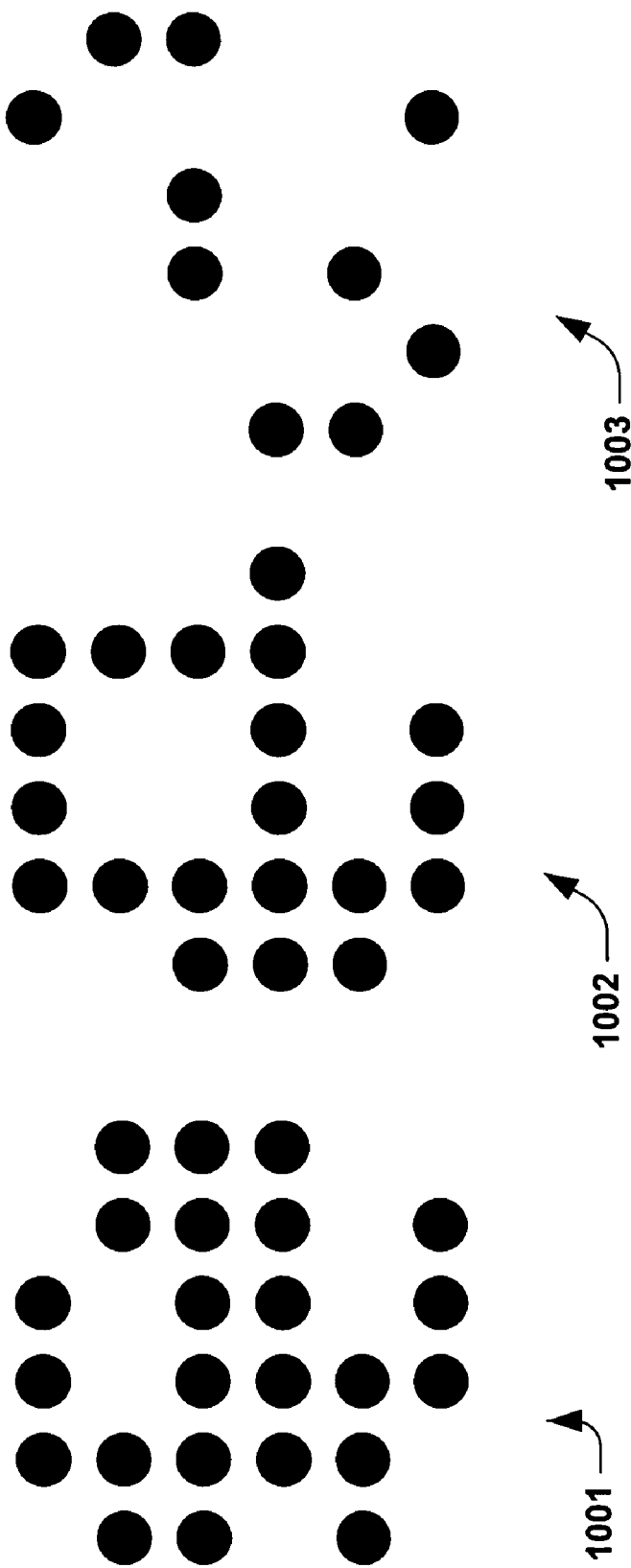
FIG. 10 illustrates an exemplary error map according to one aspect of the invention.

FIG. 10 illustrates an exemplary error map. A bitmap of a mark is shown at 1001. A bitmap of an existing cluster is shown at 1002. The bitwise exclusive-OR operation on the mark 1001 and the existing cluster 1002 is shown at the error map 1003.

Other distance computations can be employed in accordance with the present invention, such as a weighted exclusive-or (WXOR), which weights the pixels according to a number of neighboring pixels that are set; weighted AND-NOT (WAN), which is similar to the WXOR buy treats black to white errors separately from white to black errors when calculating weights; pattern matching and substitution (PMS), which rejects a match if any position in the error map is found to have four or more neighbors that are set; combined size-independent strategy (CSIS), which augments the PMS procedure by utilizing heuristics to detect thin strokes or gaps; and compression-based template matching (CTM).

Additionally, multiple distances can be computed and employed for respective comparisons of the mark to the next cluster. For example, an XOR distance, described above, can be first computed, meaning that 1 is added to the distance for every mismatched bit, followed by a more complex and more computationally expensive distance if the first distance falls within certain range.

On finding a match, the mark is added to the next cluster by the match symbol component 610. The mark is assigned a unique mark number, which is stored, along with position information, in the set of marks for the matched cluster. The position information includes, but is not limited to, x and y position coordinates, distance from a previous mark, offset information and the like. The existing clusters can include a mark count that indicates the number of marks associated with the cluster. If the matched cluster is located in the local library 616, the clusters in the local library 616 can be resorted by the number of marks belonging to each cluster, the mark count.

Collectively the match size component 606 and the match ink component 608 are referred to as a match properties component 605. The match properties component 605 screens the existing clusters to identify mismatches. The match properties component 605 can, in other aspects of the invention, include any suitable property or feature of the mark and the existing clusters that provides for a useful comparison to identify mismatches. Furthermore, alternate aspects, the match properties component 605 can include none, one or both of the size and ink size properties.

After all or substantially the marks in the document have been extracted, the two dimensional table can be discarded and the existing clusters can be transferred to a global library 618. Additionally, clusters from the two dimensional table 612 can be transferred to the global library 618 after process of respective pages of the document 602. The global library 618 includes the existing clusters from the document. Some of the information previously stored with the existing clusters can be discarded, such as ink size, because it is not needed for encoding or decoding. Generally, the position information and the bitmap images for the clusters are coded using compression schemes suited for that type of information. Once encoded, the position information and bitmap images are combined into a file or bitstream. Additionally, the number of clusters in the library should be included in the file or bitstream in order to properly decode the file. Thus, the bitstream should ultimately contain the library, the mark sequence and the position information or offsets. It is appreciated that the library can also be referred to as a dictionary, the clusters can be referred to as symbols and that the mark sequence can be referred to as a symbol sequence.

Also, the document, after all the marks have been removed, can be referred to as a residual image. For lossy compression, the residual image may be discarded. However, for lossless compression, and even some lossy implementations, the residual image is compressed and transferred in the bitstream. The residual image is likely to appear as simply noise and thus, is likely to compress very poor for most compression schemes. However, a compression scheme, which utilizes the existing clusters significantly improves the compression of the residual image. Additional analysis of the layout of the document can be performed to further increase the compression of the document. For example, the clusters and marks can be identified with horizontal lines to reduce the amount of position information needed. Additionally, commonly occurring sequences of clusters can be combined together as a merged cluster or word (e.g. "the").

According to an alternate aspect of the invention, an OCR component receives the library, mark sequence and position information and obtains and identifies characters from the clusters. The OCR component can combine one or more clusters into a single character. This is because several clusters can represent a character, for example "e", and yet be in different clusters. Additionally, the OCR component can utilize the received information to generate words, sentences and paragraphs from the received information. The characters and/or words are then represented by a library such as the common ASCII library, further improving compression.

On the decoding end, the bitstream is decoded to reconstruct a reconstructed document. If the compression is lossless, the reconstructed document is substantially identical to the document. Even if the compression is lossy, the reconstructed document is typically substantially similar to the document. It is appreciated that the reconstructed document can be a mask or layer that is combined with at least one other image or layer to form a document image.

The clustering system 600 has generally been described with respect to a document having black text on a white background. However, it is appreciated that the clustering system 600 can be used for a document image to identify clusters of any color, including but not limited to black.

Figure 11:
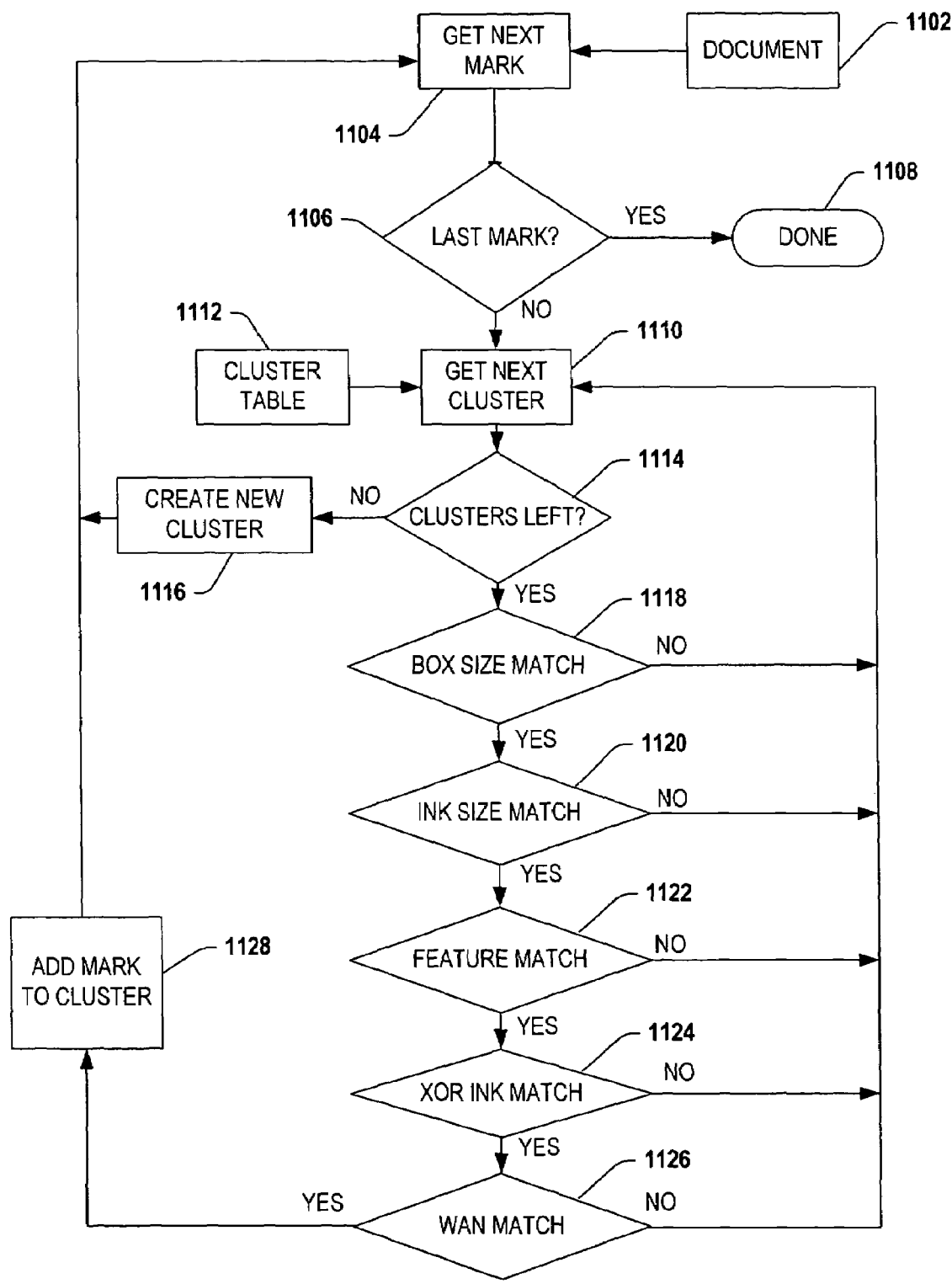
FIG. 11 is a flow diagram of a method of performing clustering according to one aspect of the invention.

In view of the exemplary systems shown and described above, methodologies that may be implemented in accordance with the present invention will be better appreciated with reference to the flow chart of FIG. 11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

FIG. 11 is a flow diagram of a method of clustering according to one aspect of the present invention. A document is provided at 1102. The document is a binary document image and includes an amount of textual information. The document can be a single page or a multipage document of any size. Additionally, the document can be a layer or component from another document image. The textual information in the document is typically black on a white background, however the textual information can also comprise white text on a black background (e.g., reverse video).

A next mark or mark is obtained from the document at 1104. The mark can be obtained employing a suitable approach or algorithm, such as described with respect to FIG. 1 and FIG. 6. Additionally, a box size, an ink size, a resized image and a center of gravity are computed for the mark. Other properties or features can also be computed for the mark. The box size includes the x size and y size of the mark. Additionally, a pointer is set to a beginning of a cluster table 1112 to facilitate processing. If the mark can not be obtained at 1106, indicating that there are no remaining marks to be processed in the document, the method is completed or exited at 1108. Thus, at 1108, the mark(s) in the document have been processed and clustered appropriately. If the mark can be obtained, a next cluster is of existing cluster(s) is retrieved at 1110. The next cluster is generally retrieved, generally, from the cluster table 1112. The cluster table 1112 maintains the existing cluster(s). If there are no clusters of the existing cluster(s) remaining at 1114, a new cluster is created at 1116.

This creation of the new cluster indicates that the mark has failed to appropriately match the existing cluster(s) or that the mark is the first mark extracted from the document. The properties or features of the mark, computed above partially comprise the new cluster. The new cluster is typically added to the bottom of the cluster table 1112 because the new cluster, by being new, is generally less likely to be encountered than other existing cluster(s).

Otherwise, a box size match or comparison is performed at 1118. The box size match compares the x size and y size of the mark to that of the next cluster. A two dimensional table can be employed to maintain the box size information of the existing cluster(s), such as depicted and described with respect to FIG. 7. Typically, a threshold is set for the comparison, such as 10 percent, or a fixed size variation (e.g. 1 or 0), to allow for minor deviations in dimensions of the mark and the next cluster. Additionally, the threshold can be adjusted to increase speed of the method and/or reduce the number of clusters found thereby increasing compression. If the box size of the mark does not match the box size of the next cluster (e.g., not within 10 percent), the method continues at 1110 where a new next cluster is obtained.

If there is a match between the box size of the next cluster and the box size of the mark, an ink size match is performed at 1120. The ink size match compares the ink size of the mark to an ink size of the next cluster and if they are identical and/or substantial similar, considered a match. The ink size is the percentage of the number of black pixels to the total number of pixels in the mark. Thus, deviations between the ink size of the mark and the ink size of the next cluster can occur and be considered a match so long as the ink size of the mark and the ink size of the next cluster are within an acceptable threshold (i.e., substantially similar). The threshold determines a range of acceptable values and can be adjusted to allow for greater or less ink size variations. Additionally, the threshold can be adjusted to increase speed of the method and/or reduce the number of clusters found thereby increasing compression. If the ink size of the mark does not match the ink size of the next cluster (e.g., not within 10 percent), also referred to as a mismatch, the method then continues at 1110 where a new next cluster is obtained.

If there is a match between the ink size of the next cluster and the ink size of the mark, a feature map match is performed at 1122. The feature map match compares the resized image of the mark to a resized image the next cluster and if they are identical and/or substantial similar, considered a match. The resized image is a 3 by 3 pixel representation of the mark or cluster and can also be referred to as a resized mark image. The resized image is computed as a smaller version, for instance a 3 by 3 pixel image, of the mark or cluster. The resized image is typically much smaller in pixel size than the mark's image. Any number of algorithms can be used to downsize the mark image into the resized mark image. One algorithm is to divide the mask into 9 regions (3 by 3), which is centered on the hot point, and scaled to cover the area of the mark, and compute the averages of the mark, when they intersect each of these regions. Another algorithm is to remove or discard a number of pixels from the bitmap. However, other algorithms can be used to generate a resized image and still be in accordance with the present invention.

Thus, a comparison between pixels of the resized image of the mark and the resized image of the next cluster is performed. If all 9 pixels or a variation thereof (threshold) match (e.g., 7 or more match), the resized image of the mark and the resized image of the next cluster are considered a match. As with the box size match and the ink size match, the threshold for the feature map match can be adjusted to increase speed of the method and/or reduce the number of clusters found thereby increasing compression. If the resized image of the mark and the resized image of the next cluster do not match, also referred to as a mismatch, the method then continues at 1110 where a new next cluster is obtained.

If there is a match between the resized image of the next cluster and the resized image of the mark, an xor ink match is performed at 1124. The xor ink match computes a distance, also referred to as an xor distance, between the bitmap of the mark and a bitmap of the next cluster. An error map is generated for the mark and the next cluster. The error map is the bitwise exclusive-OR between the bitmap images of the mark and the next cluster and centered at the center of gravity. Then, the distance is computed by adding one for each mismatched bit. If the distance is less than a threshold value, then there is a match. If the distance is greater than a threshold value, there is a mismatch and the method then continues at 1110 where a new next cluster is obtained. The threshold value can be set and/or adjusted as necessary.

If there is a match for the xor ink match, a "wan" match is performed at 1126. The wan match, referred to as a weighted AND-NOT (WAN), is performed similarly to the xor ink match at 1124. The wan match also generates an error match but treats black to white errors separately from white to black errors when calculating weights. If the distance is greater than a threshold value, there is a mismatch and the method then continues at 1110 where a new next cluster is obtained. Then, if the distance is less than a threshold value, there is a match and the method proceeds to 1128 where the mark is added to the next cluster.

The mark is added to the next cluster where a number of marks associated with the cluster is incremented. Additionally, positional information and a unique identification can be stored with the next cluster. The cluster table 1112 can be resorted such that more common existing clusters are employed first by the method. After the mark has been added to the next cluster at 1128, the method continues at 1104 where another next mark is obtained.

It is appreciated that the existing cluster(s) can be stored in a local and/or global library in an alternate aspect of the invention. The method can be performed on the existing clusters stored in the local library until a current page is processed. Then, the clusters in the local library can be merged with clusters in the global library before processing of a next page by the method continues. Clusters in the global and local libraries that are substantially similar can be merged into a single cluster, whereas non-similar clusters are added to the global library.

Figure 12:
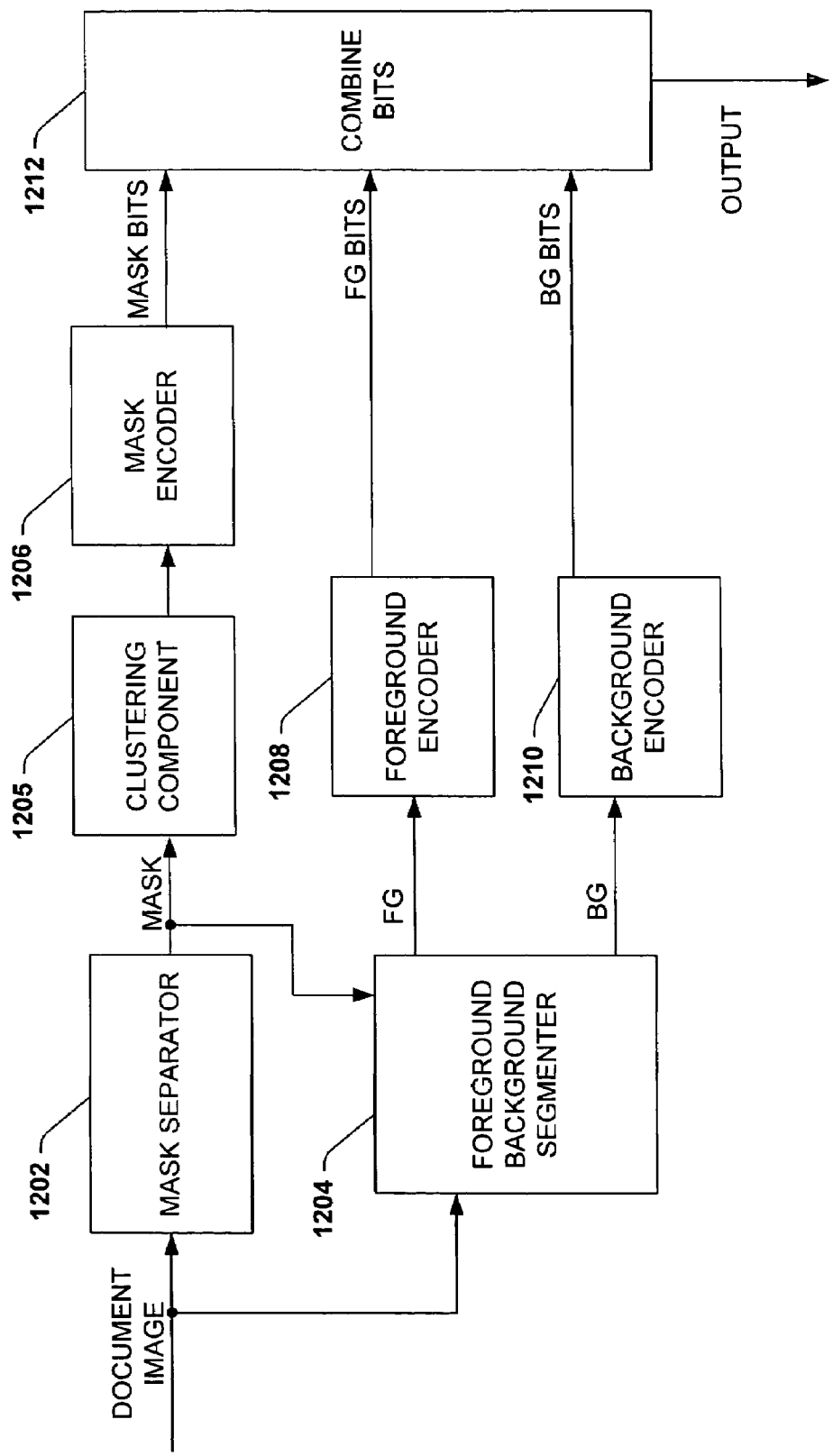
FIG. 12 is a block diagram of an image encoding system utilizing clustering according to one aspect of the invention.

FIG. 12 is a block diagram of an image encoding system utilizing computationally efficient clustering according to one aspect of the invention. The system includes a mask separator 1202, a foreground background segmenter 1204, a clustering component 1205, a mask encoder 1206, a foreground encoder 1208, a background encoder 1210 and a combine component 1212.

The mask separator 1202 receives a document image and generates a mask. The document image is a digital representation of a document. The document image can have one or more pages. The document image is, typically, scanned from a document. The document image can have any resolution, which is generally expressed as dots per inch (dpi). For example, faxed documents typically use a resolution of about 100-200 dpi. Additionally, the document image can have any pixel size or size. For example, the document image can be 640 pixels by 480 pixels and/or A4 size.

The mask generated by the mask separator 1202 is later used to segment or partition the document image into foreground and background images. The mask, also referred to as the mask image, is a binary image, where a value of each pixel determines whether that pixel belongs in the foreground image or the background image. The mask separator 1202 generates the mask that reduces the combined size of the mask, the foreground image and the background image.

Any number of approaches can be used to generate the mask that reduces the combined size of the mask, the foreground image and the background image. Similar regions or regions with small or a reduced number of variations tend to compress better than regions with large variations. For example, an image having a solid color compresses better than an image having large variations in intensity and color. For a document image having N pixels, there are $2^N$ possible masks. Thus, it is possible to go through every possible mask and determine which one generates the smallest overall combined images. However, going through every possible mask is computationally expensive. Small sub regions, for example 2 by 2 pixels or 4 by 4 pixels, can be analyzed for variance. The pixels of the sub regions can be divided into the foreground or background to reduce the variance within the foreground and background. The sub regions can then be merged together to generate the mask that reduces the combined size of the mask, the foreground image and the background image. Other methods can be used that reduce the overall size of the mask, foreground image and background image.

The foreground background segmenter 1204 receives the mask from the mask separator 1202 and the document image. The foreground background segmenter 1204 uses the mask to generate the foreground image and the background image from the document image. For each pixel of the document image, a corresponding pixel of the mask is referenced. The pixel is allocated to the foreground image or the background image based on that corresponding pixel of the mask. For example, if the corresponding pixel of the mask is a "1", the pixel is assigned to the foreground image. Conversely, if the corresponding pixel of the mask is a "0", the pixel is assigned to the background image. It is appreciated that whether a "0" or "1" indicates the foreground or background can vary.

The background image and the foreground image now have holes or vacant regions where pixels were direct to the other image. The vacant regions can be handled in any manner so as to reduce the overall compression size of the foreground and background images. One approach is to fill these vacant regions with don't care pixels. The don't care pixels are selected so as to increase compression and reduce the size of the image. Other approaches can be used and still be in accordance with the invention.

Additionally, the foreground image and the background image are disjoint of each other. However, this can cause visible edges to be reproduced in a, ultimately, recombined document image. A number of approaches can be used to reduce these visible edges. The foreground and background images can be extended a number of pixels into each other making them no longer disjoint. Thus, visible edges in the recombined document image can be reduced.

The clustering component 1205 receives the mask from the mask separator 1202 and generates a library of clusters, a mark sequence and position information. The clustering component 1205 finds and removes marks from the mask, one at a time. The clustering component 1205 utilizes at least one table storing a property of existing clusters. A property of an extracted mark from a document is quickly compared to the properties of the existing clusters in the at least one table. This comparison does not require a timely and expensive, bit by bit, comparison of the mark's bitmap to the existing cluster's bitmaps to identify mismatches. If the property of the mark fails to match any of the properties in the table, the mark is added as a new cluster and a bit by bit comparison is avoided.

One property of the clusters that can be in one of the at least one tables is x size and y size. The x size and y size provides size information of the existing clusters. An x size and a y size of a mark can quickly be compared to the x size and y size of existing clusters to identify mismatches. Another property of the clusters that can be in one of the at least one tables is ink size. The ink size generally refers to the ratio of black pixels to total pixels in a mark or cluster. Similarly, an ink size of a mark can quickly be compared to the ink size of existing clusters to identify mismatches. A final property of the clusters that can be in one of the at least one tables is a reduced mark or image. The reduced mark or image is a pixel size reduced version the bitmap of the mark and/or cluster. Likewise, the reduced mark can quickly be compared to the reduced mark or reduced image of existing clusters to identify mismatches. These properties are discussed in further detail with respect to FIG. 1 and FIG. 6.

If any existing clusters remain that have not been mismatched by a comparison using the at least one table, the bitmap of the mark is compared to the bitmap of remaining existing clusters. This bitmap comparison is a bit by bit comparison. A distance, such as an "xor" distance is computed by the bit by bit comparison. The smaller the distance is, the closer the match is. Other suitable distance computations can be employed and still be in accordance with the present invention. If a most matched existing cluster is identified, the mark is added to a set of marks belonging to the matched existing cluster.

The mask encoder 1206 receives the mask, the library of clusters, the mark sequence and the position information from the clustering component 1205 and encodes the mask to generate compressed bits or a compressed mask stream of bits from the mask. Any encoding technique can be used for the mask encoder 1206. However, it is appreciated that the mask is binary and, thus, a compression method should be chosen that makes use of the binary aspect of the mask.

Typically, a big-level lossless compression scheme is used to encode the mask. However, other compression methods or schemes can be used.

An exemplary compression scheme that can be used to encode the mask is CCITT (Consultative Committee on International Telephone and Telegraph). The CCITT is currently known as ITU-T International Telecommunications Union-Telecommunications Sector (changed name in 10994)) which is a standards group and a name of a lossless compression technology for fax/modem communication. This type of compression works best with black and white text and images, big-level images. Typical compression ratios are 4:1 for the older version V.42bis, and 6:1 for newer version V.44 2000, which is based on the Lempel-Ziv-Jeff-Heath (LZJH) compression algorithm.

The foreground encoder 1008 receives the foreground image and encodes the foreground image to generate compressed bits or a compressed foreground stream of bits from the foreground image. Any encoding technique can be used for the foreground encoder 1208. For example, progressive wavelength encoding or progressive transform encoding can be used to encode the foreground image.

The background encoder 1210 receives the background image and encodes the background image to generate compressed bits or a compressed background stream of bits from the background image. For example, progressive wavelength encoding or progressive transform encoding can be used to encode the foreground image.

As stated above, the foreground image and the background image have don't care regions. The don't care regions can be handled a number of ways. One approach is to fill the don't care regions with data and then use a regular compression technique. The simplest way would be to fill the don't care regions of the images with an average pixel value for that image. However, this way creates sharp discontinuities at the mask boundaries. This way also increases the required bit rate for a given peak signal-to-noise ratio (PSNR) and produces noticeable ringing near the mask or don't care region boundaries. Another way is to color each pixel with the color of the closest non-masked (or non don't care region) pixel. A standard morphology algorithm allows that process to be performed with only two passes over all the pixels leading to Voronoi-filled don't care regions under the mask. Then, when the foreground or background image is reconstructed, the reconstructed image is low-passed and then the known pixels are restored to their correct values. If the lowpass filter cutoff frequency is too low, sharp edges can occur causing an increase in the required bit rate and noticeable ringing near boundaries.

The combiner component 1212 receives the compressed bits from the mask encoder 1206, the foreground encoder 1208 and the background encoder 1210 and combines the bits into an output stream or output file. The combiner component 1212 can include header information in the output file identifying or providing information such as encoding types, dictionaries, libraries and the like that can be used by a decoder to reconstruct the document image.

In order to provide additional context for various aspects of the present invention, FIG. 12 and the following discussion are intended to provide a brief, general description of one possible suitable computing environment 1210 in which the various aspects of the present invention may be implemented. It is to be appreciated that the computing environment 1210 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

Figure 13:
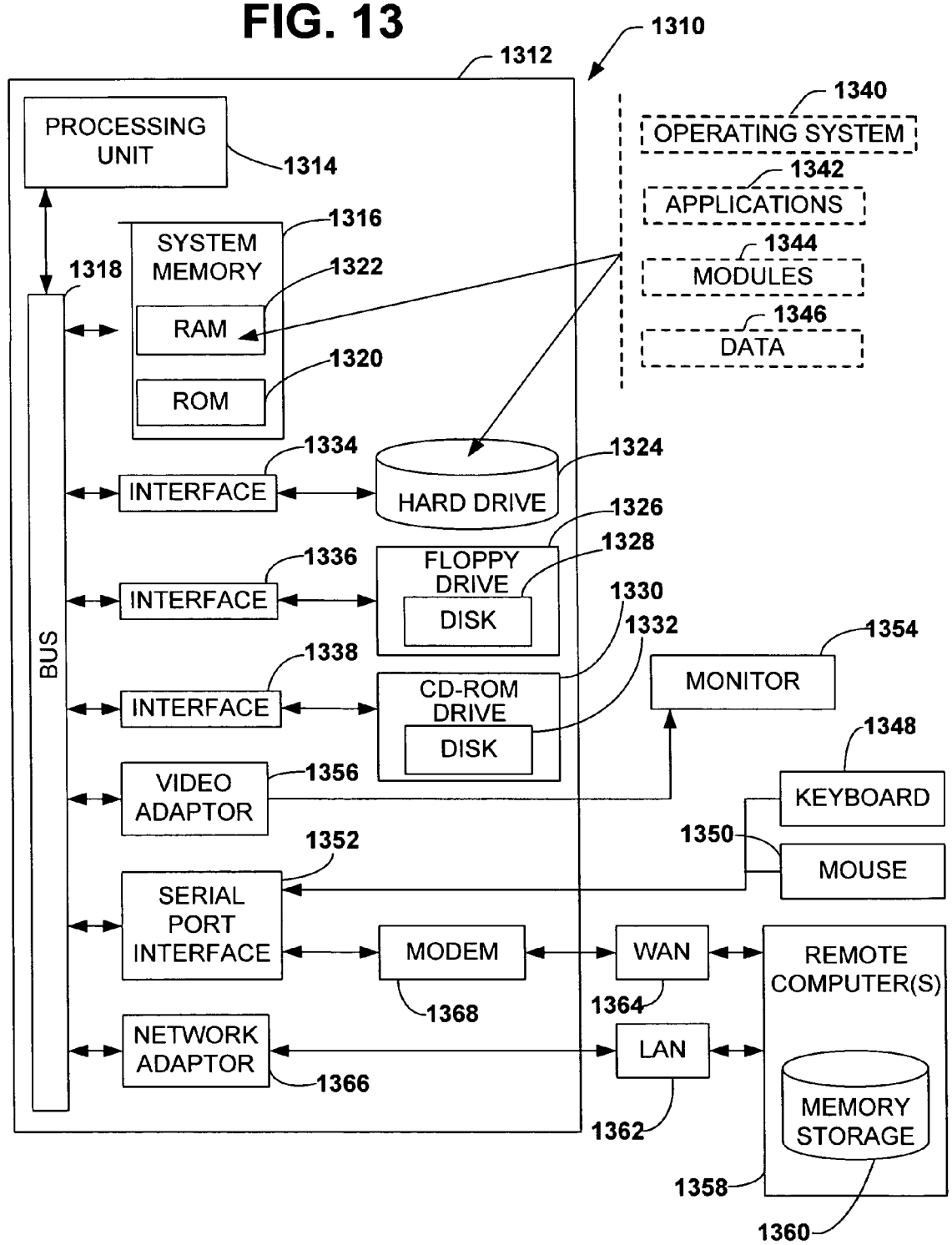
FIG. 13 illustrates an exemplary operating environment in which the present invention may function.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The system memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
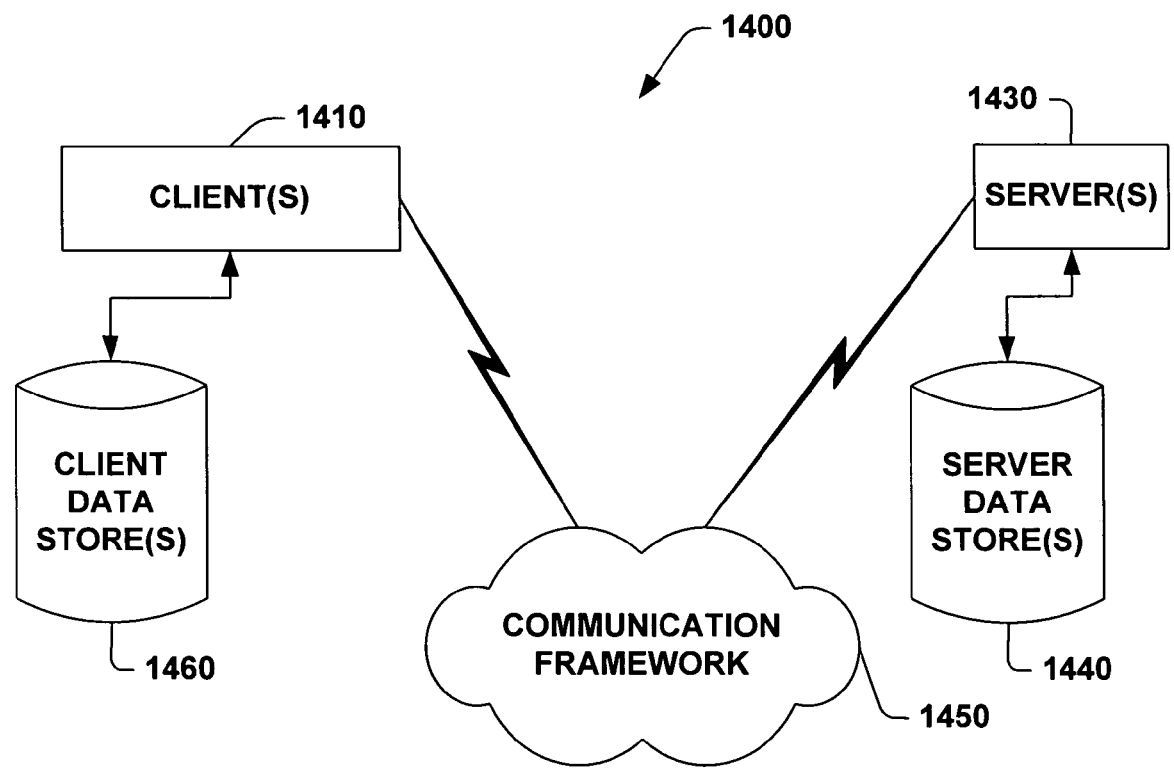
FIG. 14 is a schematic block diagram of an exemplary communication environment in accordance with the present invention.

FIG. 14 is a schematic block diagram of a sample computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A clustering system comprising:
    a mark extractor to extract a mark from a document, wherein a user has submitted the document to be encoded in a digitally compressed representation of the document;
    a match component that compares at least one property of the mark to properties of existing clusters of marks so as to identify matching existing clusters, wherein the mark is added as a new cluster when no existing cluster of marks has a matching property to the mark;
    a two dimensional table that stores the existing clusters; and
    a match symbol component that compares the mark to the matching existing clusters to identify a matching cluster that most closely matches the mark.

2. The clustering system of claim 1, further comprising a library to store the existing clusters.

3. The system of claim 1, further comprising a table of match properties of the existing clusters.

4. The clustering system of claim 2, the library comprising a local library and a global library, the local library comprising existing clusters added from a current page of the document and the global library comprising existing clusters added from previous pages of the document.

5. The clustering system of claim 1, the mark extractor being operative to locate the mark and extract the mark from the document.

6. The clustering system of claim 1, the match properties comprising x sizes and y sizes for the existing clusters.

7. The clustering system of claim 1, the match properties comprising ink sizes for the existing clusters.

8. The clustering system of claim 1, the match properties comprising resized images for the existing clusters.

9. The clustering system of claim 6, the at least one property of the mark being x size and y size.

10. The clustering system of claim 7, the at least one property of the mark being ink size.

11. The clustering system of claim 8, the at least one property of the mark being a resized mark image.

12. The clustering system of claim 1, the match component operative to compute an acceptable range of properties.

13. The clustering system of claim 1, the match component further operative to add the mark as a new cluster on the mark mismatching the existing clusters.

14. The clustering system of claim 1, the match symbol component being further operative to add the mark to a set of matching marks of the most matching cluster.

15. The clustering system of claim 13, further comprising a library, the library being operative to store the existing clusters and to sort the existing clusters according to a frequency of occurrence for the existing clusters.

16. A photocopier employing the clustering system of claim 1.

17. A fax machine employing the clustering system of claim 1.

18. A digital camera employing the clustering system of claim 1.

19. A method of clustering comprising:

locating a mark within a document, wherein the document is to be encoded in a digitally compressed representation of the document;

comparing a first property of the mark with first properties of existing clusters to identify matching and mismatching existing clusters;

on a match of the first property, comparing a bitmap of the mark with bitmaps of the matching existing clusters to find a matched existing cluster of the matching existing clusters; and on one of a mismatch of the first property and on a mismatch of the bitmap, adding the mark as a new cluster to the existing clusters.

20. A computer readable medium storing computer executable components to perform the following:

a component for locating a mark in a document, wherein the document is to be encoded in a digitally compressed representation of the document;

a component for comparing a first property of the mark with first properties of existing clusters to identify matching and mismatching existing clusters;

on a match of the first property, a component for comparing a bitmap of the mark with bitmaps of the matching existing clusters to find a most matched cluster of the matching existing clusters; and on one of a mismatch of the first property and on a mismatch of the bitmap, a component to add the mark as a new cluster to the existing clusters.

* * * * *